(12) United States Patent
Simmons

(10) Patent No.: US 7,740,251 B2
(45) Date of Patent: Jun. 22, 2010

(54) HAND TRUCK FOR APPLIANCES

(76) Inventor: Edward J. Simmons, 95 E. Serpentine Dr., Bayville, NJ (US) 08721

( * ) Notice: Subject to any disclaimer, the term of this patent is extended or adjusted under 35 U.S.C. 154(b) by 901 days.

(21) Appl. No.: 11/592,201

(22) Filed: Nov. 3, 2006

(65) Prior Publication Data

US 2007/0114739 A1   May 24, 2007

Related U.S. Application Data

(60) Provisional application No. 60/738,996, filed on Nov. 23, 2005.

(51) Int. Cl.
  *B62B 3/04* (2006.01)
  *B62B 1/10* (2006.01)
  *B62B 1/14* (2006.01)

(52) U.S. Cl. .............. 280/47.27; 280/43.11; 280/43.14; 280/47.19; 280/47.23; 280/47.24; 414/490

(58) Field of Classification Search ................ 280/43.1, 280/43.11, 43.14, 47.131, 47.17, 47.19, 47.23, 280/47.24, 47.27; 414/490
See application file for complete search history.

(56) References Cited

U.S. PATENT DOCUMENTS

| | | | |
|---|---|---|---|
| 1,512,454 A | 10/1924 | Cade | |
| 1,790,319 A | 1/1931 | Rall | |
| 2,385,514 A | 9/1945 | Hawkins | |
| 2,439,581 A | 4/1948 | Robins | |
| 2,510,676 A | 6/1950 | Biek | |
| D162,163 S | 2/1951 | Hewitt | |
| 2,764,420 A * | 9/1956 | Morrissy | 280/47.24 |
| 2,780,476 A * | 2/1957 | Upchurch | 280/47.24 |
| 2,820,643 A | 1/1958 | Cohn | |
| 3,941,399 A | 3/1976 | Peters | |
| 4,902,187 A * | 2/1990 | Rousseau | 414/456 |
| 5,029,884 A | 7/1991 | Maendel | |
| 5,624,224 A * | 4/1997 | Brandenburg | 414/490 |
| 5,667,239 A * | 9/1997 | Yang | 280/646 |
| D404,877 S | 1/1999 | Popham | |
| 6,053,516 A * | 4/2000 | Ottaway | 280/79.5 |
| 6,394,471 B1 * | 5/2002 | Watson | 280/47.19 |
| 6,789,808 B2 * | 9/2004 | Yang | 280/47.24 |
| 6,799,769 B2 * | 10/2004 | Ziolkowski | 280/47.27 |
| 7,513,511 B2 * | 4/2009 | Chaseateau | 280/47.27 |
| 2006/0082086 A1 * | 4/2006 | Donaldson | 280/47.27 |

FOREIGN PATENT DOCUMENTS

| | | |
|---|---|---|
| DE | 3806754 | 9/1989 |
| GB | 2067479 | 7/1981 |

* cited by examiner

*Primary Examiner*—Lesley Morris
*Assistant Examiner*—John R Olszewski
(74) *Attorney, Agent, or Firm*—Richard C. Litman

(57) ABSTRACT

The hand truck for appliances is a device for moving a water heater and other appliances. The hand truck includes a main frame having a pair of wheels mounted on a lower end rearward of the main frame, and a support plate also mounted on the lower end and projecting forward from the main frame. The support plate has a front edge and a rear edge, with the rear edge being contoured to be received within a water heater drain pan, with the rear edge being positioned adjacent and contiguous to the inner wall of the water heater drain pan. This allows the water heater to be carried on the hand truck for appliances, supported by the support plate, in order to be placed directly into the water heater drain pan.

20 Claims, 5 Drawing Sheets

HAND TRUCK FOR APPLIANCES

CROSS-REFERENCE TO RELATED APPLICATION

This application claims the benefit of U.S. Provisional Patent Application Ser. No. 60/738,996, filed Nov. 23, 2005.

BACKGROUND OF THE INVENTION

1. Field of the Invention

The present invention relates to appliance moving devices, and particularly to a hand truck for appliances that is particularly useful as a dolly for transporting a water heater to a water heater drain pan.

2. Description of the Related Art

Water heaters are common appliances in homes and in commercial businesses. Even when empty and ready to be installed, water heaters are very heavy and, due to their size and weight, cannot be easily transported. Thus, it is necessary to utilize a hand truck, cart, dolly or the like in order to install a water heater.

Typically, a water heater is loaded onto such a cart or dolly, transported to the installation site, lifted off the cart or dolly, and then manually lifted into the water heater drain pan. Typical carts and dollies are not configured so that the water heater can simply be inserted into the drain pan. The water heater must first be unloaded, and then multiple people must manually lift and transport the water heater into the drain pan. It would be far more efficient to provide a moving device that could not only transport the water heater to the drain pan, but also deposit and position the water heater in the drain pan, thus saving the time and energy required to unload the water heater and then manually lift and position the water heater into the drain pan. Thus, a hand truck for appliances solving the aforementioned problems is desired.

SUMMARY OF THE INVENTION

The hand truck for appliances is a device for moving a water heater or the like. The hand truck includes a main frame having a pair of wheels mounted on a lower end, with a support plate mounted on spacer bars that project forward from the lower end of the main frame. The main frame is a substantially U-shaped support formed from a pair of tubular members joined together at upper ends thereof. A support arm is pivotally mounted adjacent the upper end of the main frame and is foldable into the plane defined by the pair of tubular members.

The support plate has a front edge and a rear edge, with the rear edge being contoured to be received within a water heater drain pan, the rear edge being positioned adjacent and contiguous to the inner wall of the water heater drain pan. This allows the water heater to be carried on the hand truck, supported by the support plate, and to be placed directly into the water heater drain pan. The support plate is positioned forward of the main frame and is adapted for providing support of the lower wall of the water heater.

A pair of parallel horizontal supports curve rearward across the U-shaped frame. A vertical support rod and an arcuate handle are attached to the horizontal supports and extend rearward from the lower half of the main frame. The wheels of the hand truck are mounted on an axle that is supported rearward from the main frame centrally by the lower end of the handle and laterally by V-shaped supports extending from the main frame.

The hand truck further includes an adjustable strap for securing the water heater to the hand truck.

In an alternative embodiment, the main frame includes parallel spaced apart vertical supports and a generally circular upper frame member attached to upper ends of the vertical supports. The lower ends of the vertical supports are attached medially to spacer bars arranged in a V-shape. A bracket is attached to the vertex of the V-shaped spacer bars, the bracket supporting an axle tube extending rearward of the main frame. Wheels are rotatably mounted at opposite ends of the axle tube. A support plate for lifting the bottom of a water heater is attached to tubes that depend from the front ends of the V-shaped spacer bars so that the support plate is offset forward from the main frame. One or more support arms may pivotally extend forward from the main frame, and may terminate in a concave bar for supporting the upper portion of the water heater. Straps may be provided for securing the water heater to the hand truck.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
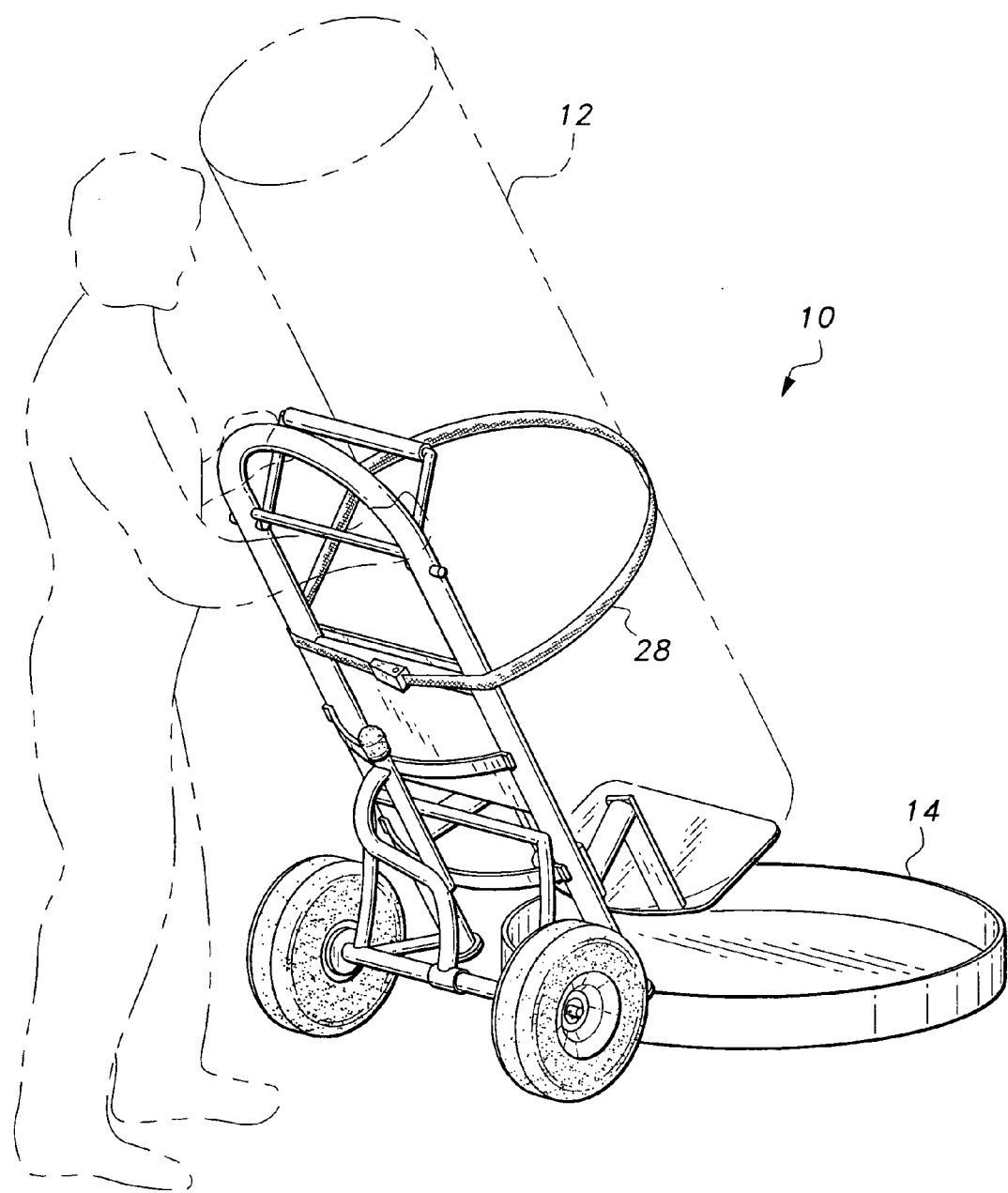
FIG. 1 is an environmental, perspective view of a hand truck for appliances according to the present invention.

As illustrated in FIG. 1, the hand truck for appliances 10 is provided for the transport of a water heater 12 to the site of installation, and the subsequent placing and positioning of the water heater 12 within a water heater drain pan 14. Conventional carts, hand trucks or dollies require the user to transport the water heater to the site, unload the water heater, and then manually lift the water heater into the drain pan. The hand truck for appliances 10 of the present invention, however, allows the user to lower the water heater 12 directly into the drain pan 14 without first unloading the water heater 12 from the dolly 10, as will described in further detail below. It should be understood that although hand truck 10 is particularly well suited for transport of a water heater 12, the hand truck 10 may also be used for transporting any appliance, as desired.

Figure 2:
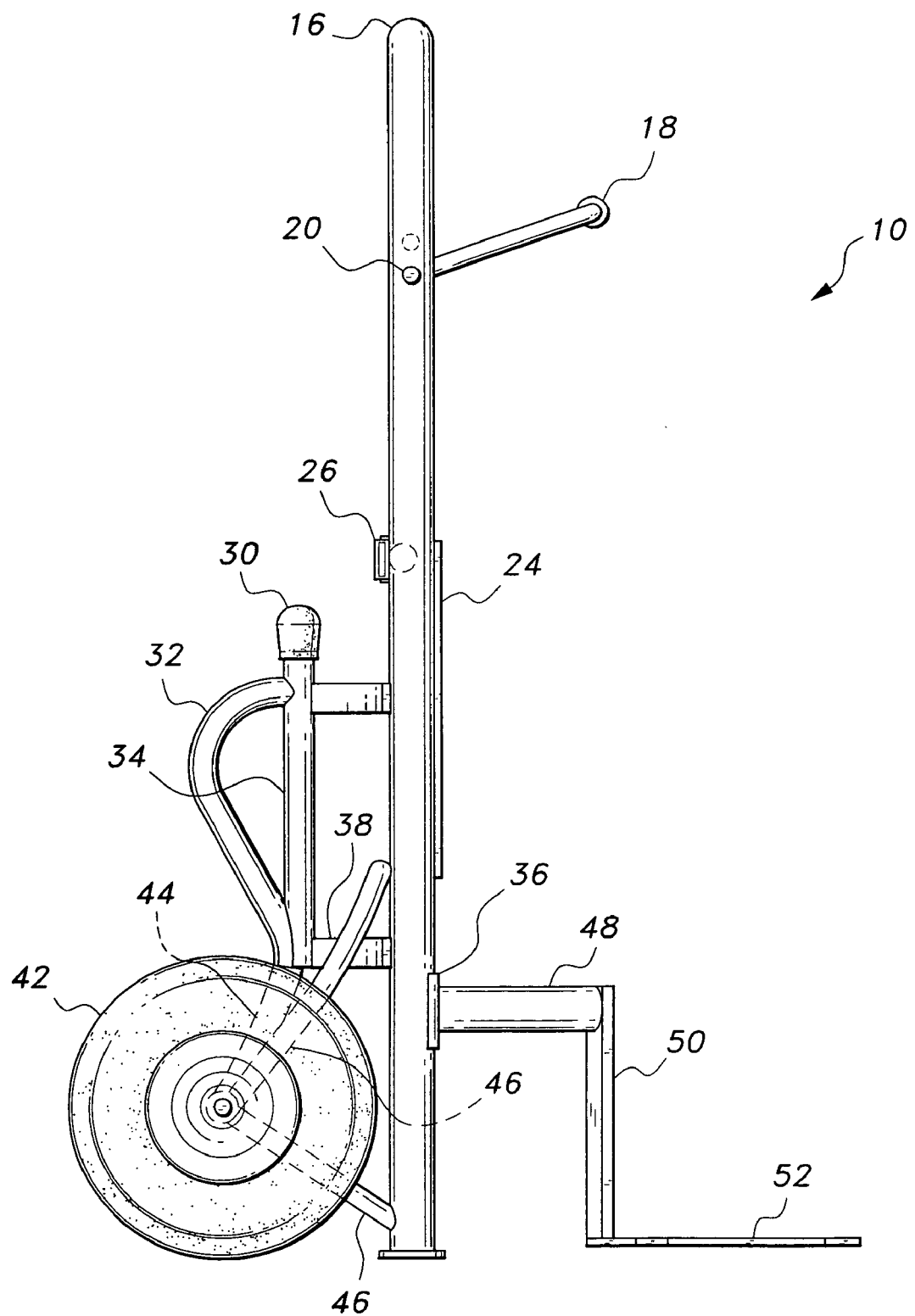
FIG. 2 is a side view of the hand truck for appliances according to the present invention.
Figure 3:
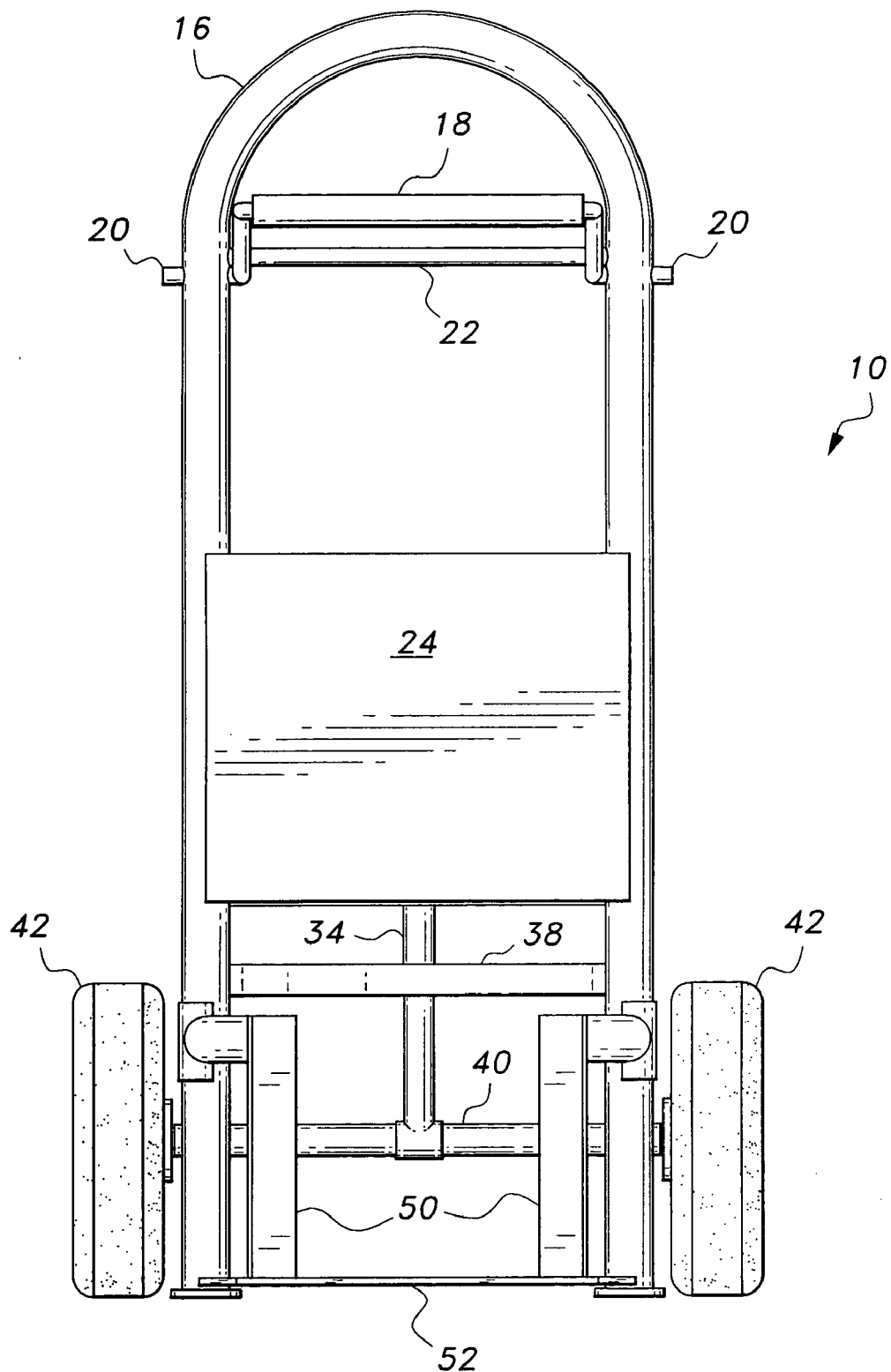
FIG. 3 is a front view of the hand truck for appliances according to the present invention.

As shown in FIGS. 2 and 3, the hand truck for appliances 10 includes an inverted U-shaped frame 16, formed from a pair of arcuately shaped tubular members joined to each other at their upper ends. Near the upper end of the inverted U-shaped frame 16, a pivoting support arm 18 is mounted between the pair of arcuately shaped tubular members. Pivoting support arm 18 may be formed in a C-shape by rectilinear segments. The opposed ends of the pivoting support arm 18 are received within passages formed through the tubular members, and are secured thereto by threaded end caps 20. The threaded end caps 20 are secured to the frame 16, and provide limited rotational movement of support arm 18 about the rotational axis thereof. In the preferred embodiment, the end caps 20 may be one-quarter inch threaded caps welded to frame 16. The central portion of support arm 18 may be coated in rubber or other material for preventing damage or marring of the surface of the water heater 12 and to prevent the load from slipping on support arm 18.

Although the size, shape and materials used in the construction of the hand truck for appliances are dependent upon the needs and desires of the user, in the preferred embodiment, the frame 16 is formed from approximately 1-inch thick steel pipe. Further, pivoting support arm 18, in the preferred embodiment, is approximately nine and one-quarter inches long, and the vertical height between the support surface, such as the ground or floor, and the bottom of the end caps 20 is approximately forty inches.

Pivoting support arm 18 may be folded downwardly so that support arm 18 is folded into the plane defined by the pair of tubular members. This allows water heater 12 to be loaded onto the hand truck for appliances 10 without interference from the support arm 18. Additionally, a crossbar 22 is mounted above support arm 18, and also between the pair of tubular members. Crossbar 22 limits upward movement of pivoting support arm 18 and further provides structural stability to the hand truck 10. In the preferred embodiment, pivoting support arm 18 may be formed from pipe having an inner diameter of approximately one-quarter inch and an outer diameter of approximately one-half inch. Pivoting support arm 18 may be further secured to frame 16 through the addition of washers or other spacing and fastener elements. The central portion of pivoting support arm 18 may be covered with a padding material, such as rubber, to minimize the risk of damage to the water heater 12 when the water heater 12 is loaded on the hand truck or dolly 10 and contacts pivoting support arm 18.

As best shown in FIGS. 1 and 3, axle tube 40 is supported centrally by a short transverse tube at the end of the lower portion 44 of handle 32. Axle tube 40 is further supported laterally by V-shaped supports 46. Wheels 42 are mounted on opposite ends of an axle rotatable in axle tube 40, or have wheel bearings mounted in their hubs that are mounted on axles extending from opposite ends of axle tube 40. As shown, the upper legs of V-shaped supports 46 extend from a transverse member, which extends laterally across the rear of U-shaped frame 16. The lower legs of V-shaped supports extend from the lower ends of U-shaped frame 16. Each of wheels 42, in the preferred embodiment, may include a rubber tire and have a diameter of approximately ten inches.

As shown in FIGS. 1-3, horizontal support member 38 has a slightly arcuately contoured shape and supports the lower end of vertical support 34, which, in turn, supports a medial portion of handle 32. A similar upper curved support is provided adjacent the upper end of vertical support 34. In the preferred embodiment, these arcuately contoured supports are formed from approximately 1-inch thick flat steel, and vertical support 34 is formed from steel pipe having a diameter of approximately three-quarters of an inch.

V-shaped supports 46 may be secured to axle tube 40 through welding or the like, with the vertices of V-shaped supports 46 being joined to the axle tube 40, as shown in the drawings. In the preferred embodiment, V-shaped supports 46 may be curved metal pipe having a diameter of approximately one inch, and a thickness of approximately one-sixteenth of an inch, though the thickness and diameter of supports 46 may be adjusted as required.

As best shown in FIG. 2, a curved handle member 32 is formed on vertical support 34, and projects rearwardly therefrom. Both vertical support 34 and curved handle member 32 provide gripping surfaces and supports for the user, allowing the user to support and steer the dolly 10 when the dolly 10 has a load, such as water heater 12, mounted thereon. The upper end of vertical support 34 may be covered with an optional rubber cap 30, providing the user with another gripping surface, and protecting the user from injury from the upper end of the support 34. In the preferred embodiment, curved handle member 32 may be approximately three-quarters of an inch thick steel pipe.

Figure 4:
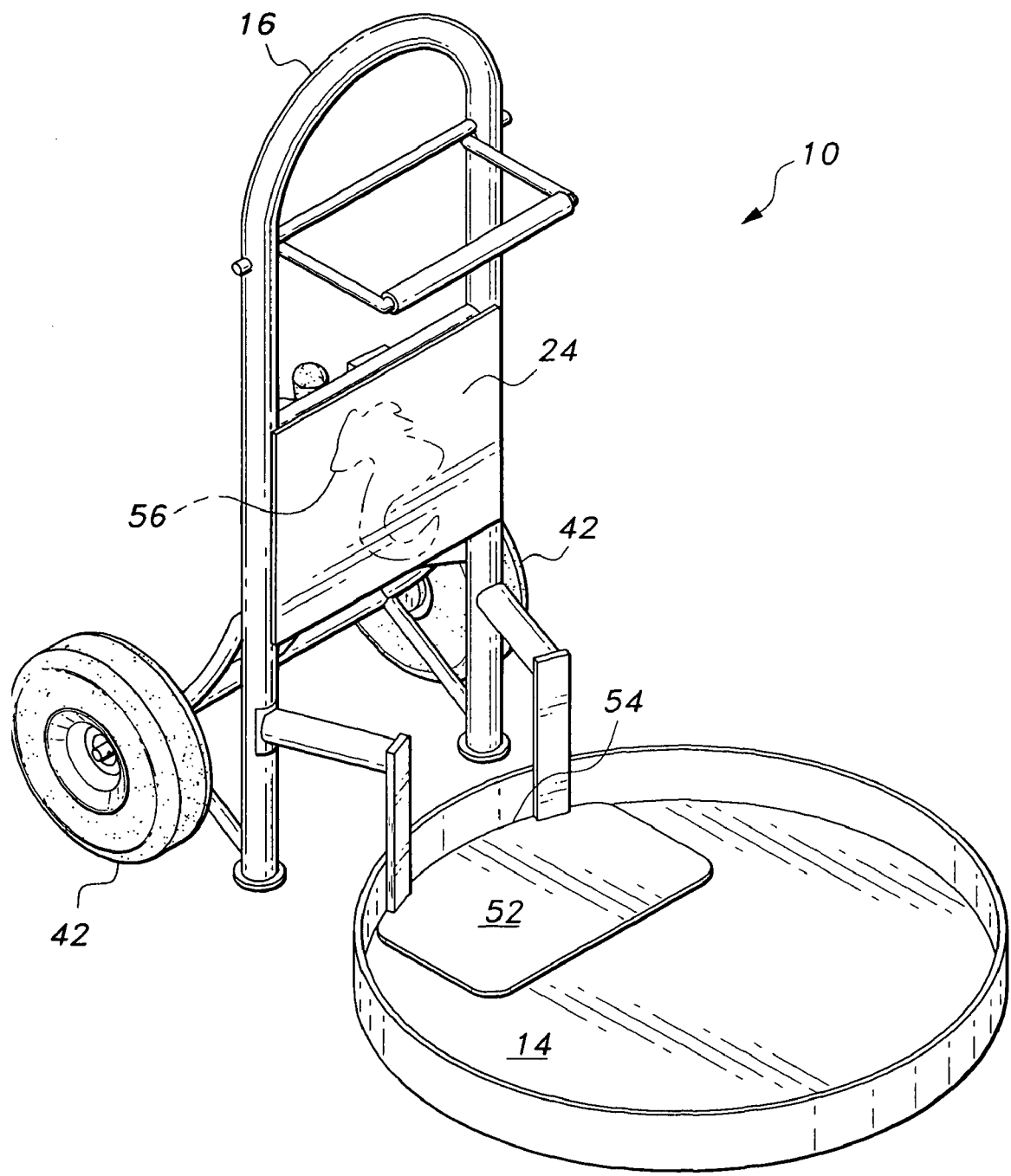
FIG. 4 is a perspective view illustrating the reception of the support plate of the hand truck for appliances of the present invention in a water heater drain pan.

A vertical plate 24 is mounted to the front surface of frame 16, and is positioned substantially centrally thereon. As shown in FIG. 4, indicia 56, such as a trademark or trade name, may be imprinted on the front surface of vertical plate 24. In the preferred embodiment, vertical plate 24 has a height of approximately twelve inches and may be formed of one-eighth of an inch thick sheet metal.

A buckle 26, which may be a ratcheting type buckle or the like, is mounted on the rear surface of frame 16, for use with strap 28, as best shown in FIG. 1. Strap 28 wraps around water heater 12, securing the water heater 12 to the dolly 10, and strap 28 may be adjusted through use of buckle 26. Buckle 26 and strap 28 may be further supported on an additional crossbar provided behind vertical plate 24.

A pair of mounting plates 36 are secured to the front surface of frame 16 at the lower end thereof. Respective rear ends of horizontal spacer bars 48 are mounted on mounting plates 36 and project forwardly therefrom. In the preferred embodiment, horizontal spacer bars 48 may be steel pipes having a diameter of approximately one inch, and are welded to mounting plates 36. A pair of downwardly directed plate mounts 50 are fixed to horizontal spacer bars 48, as shown in FIGS. 2 and 3, and horizontal support plate 52 is secured to the lower ends of plate mounts 50. In the preferred embodiment, plate mounts 50 are separated by approximately eight and one-half inches from one another. Further, in the preferred embodiment, each plate mount 50 should have a thickness of approximately ½ of an inch, and a width of approximately one inch. Preferably, plate mounts 50 are formed of steel, and are strong, stable and thick enough to provide support for the weight of water heater 12. Further, horizontal support plate 52 provides support for the bottom wall of water heater 12, as best shown in FIG. 1. In the preferred embodiment, horizontal support plate 52 may be flat steel and is approximately twelve inches wide.

As shown in FIGS. 3 and 4, plate mounts 50 are joined to opposed sides of support plate 52, along a rear edge 54 thereof. Plate mounts 50 provide additional support for the sidewall of water heater 12 when water heater 12 is mounted on hand truck 10. Plate mounts 50 may be coated with a padding material, such as rubber, in order to reduce the risk of damage to the water heater 12. Rear edge 54, as best shown in FIG. 4, is contoured to match the contour of the inner wall of drain pan 14. Although shown as being a section of a circle to match the circular contour of drain pan 14, the rear edge 54 can be contoured to match any size and shape drain pan that may be provided.

In use, the user transports the water heater 12 on hand truck 10, as shown in FIG. 1. The water heater 12 and horizontal support plate 52 are both lowered into drain pan 14, with the rear edge 54 contacting the interior wall of drain pan 14, as shown in FIG. 4. The user releases strap 28, and then both the water heater 12 and dolly 10 are tipped forward slightly with respect to the horizontally positioned drain pan 14, and the horizontal support plate 52 is slipped out from between the water heater 12 and the drain pan 14.

Figure 5:
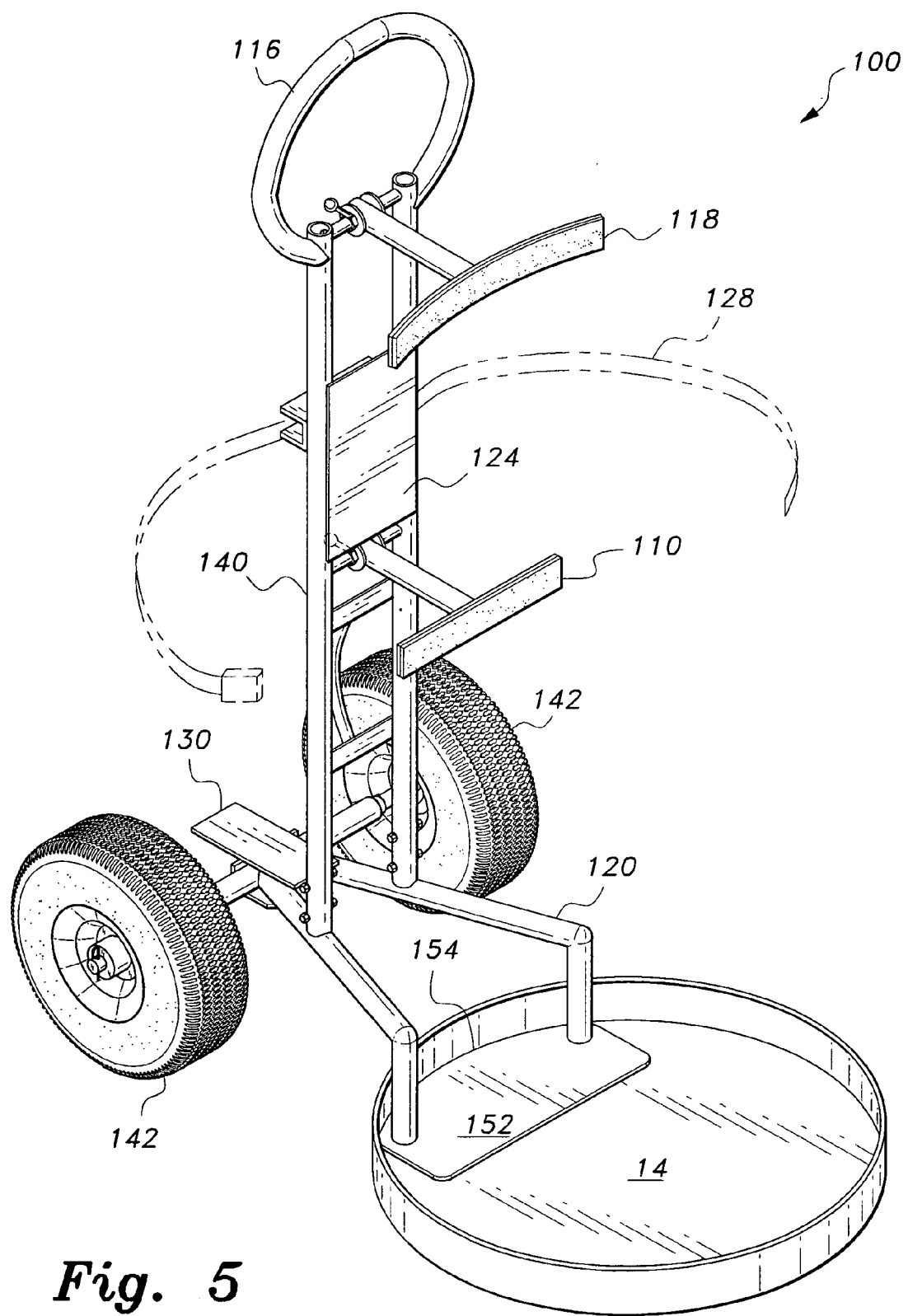
FIG. 5 is a perspective view of an alternative embodiment of the hand truck for appliances according to the present invention.

In the alternative embodiment of FIG. 5, hand truck 100 includes a main frame, similar to frame 16 of the hand truck 10 of FIGS. 1-4, but with a substantially circular upper frame portion 116 that forms a major arc of a circle joined to a pair of vertical support members 140 having a plurality of crossbars maintaining the vertical support bars 140 in parallel relation. (It will be noted that both hand truck 10 and hand truck 100 have a main frame formed from two parallel spaced apart vertical support members joined by an arcuate member at their upper ends.) The function of the combination of upper frame portion 116 and vertical support members 140 is similar to the function of U-shaped frame 16, and represents a choice of contouring and formation which may be preferable to the user in terms of aesthetics, ergonomics and manufacture.

Similarly, hand truck 100 includes a pair of wheels 142, similar to wheels 42. A tube is supported by bracket 130 rearward of the main frame and has axles extending from opposite ends thereof. Wheels 142, with wheel ball bearing assemblies mounted in their hubs, are retained on the axles by split pins, cotter pins, or the like. In the embodiment of FIG. 5, horizontal spacer bars 120 are also joined to, and held in place by, bracket 130 in a V-shaped configuration. Horizontal spacer bars 120 are similar to horizontal spacer bars 48 of hand truck 10, extend forward of the main frame and support and position horizontal support plate 152 forward of the main frame within pan 14 and offset from the plane of vertical supports 140 and circular upper frame member 116.

Further, in the embodiment of FIG. 5, pivoting support arm 18 of the hand truck 10 is replaced by a pivoting support bar 118, which preferably includes a concave bar extending laterally across the end of a support rod, which, in turn, is attached to a threaded lever with hand knob pivotally mounted across the upper ends of vertical supports 140. The pivoting support bar 118 may be extended, as shown in FIG. 5, for supporting the upper portion of a cylindrical appliance, such as a water heater 12, and may be pivoted downward to the plane of the main frame and locked in position by the threaded lever when not required to support a load. A second pivoting support bar 110 may further be added medially, as shown, for providing additional support for water heater 12, and locked in extended or retracted positions by a threaded lever, similar to pivoting support bar 118. Hand truck 100 further includes a face vertical plate 124, similar to vertical plate 24, and straps 128, similar to straps 28 of hand truck 10, supported by a bracket mounted on the rear of the main frame.

It is to be understood that the present invention is not limited to the embodiment described above, but encompasses any and all embodiments within the scope of the following claims.

I claim:

1. A hand truck for appliances, comprising:
    a main frame having a pair of parallel, spaced-apart vertical support members, each of the vertical support members having an upper end and a lower end, and an arcuate member joining the upper ends of the vertical support members;
    a pair of wheels mounted rearward of the main frame;
    an upper support arm pivotally mounted to the main frame adjacent the upper ends of the vertical support members, the upper support arm being selectively lockable in an extended position normal to the main frame for supporting an upper end of an appliance, and being pivotal to a retracted position coplanar with the main frame;
    a pair of spacer bars extending forward of the main frame; and
    a support plate extending forward of the spacer bars, the support plate being adapted for supporting a lower wall of the appliance when the appliance is placed thereon, the spacer bars offsetting the support plate from the main frame so that the support plate is capable of lifting the appliance over a peripheral wall of an appliance drain pan without removing the appliance from the support plate.

2. The hand truck for appliances according to claim 1, wherein said support plate has an arcuate edge facing said main frame, the arcuate edge being configured for abutting the peripheral wall of an arcuate water heater drain pan.

3. The hand truck for appliances according to claim 1, wherein said arcuate member comprises an arch, said main frame being substantially U-shaped.

4. The hand truck for appliances according to claim 1, wherein said arcuate member comprises a tubular member shaped as a major arc of a circle, the arc having ends attached to the upper ends of the vertical support members.

5. The hand truck for appliances according to claim 1, wherein said upper support arm comprises a C-shaped member formed with rectilinear segments.

6. The hand truck for appliances according to claim 5, wherein said C-shaped member has at least one segment coated with padding material to prevent marring a surface of the appliance.

7. The hand truck for appliances according to claim 6, further comprising threaded caps attached to said main frame, said C-shaped member having opposing ends engaging the threaded caps in order to pivot thereon.

8. The hand truck for appliances according to claim 6, further comprising a crossbar extending between the vertical support members of said main frame, the crossbar being positioned to limit rotation of said upper support arm.

9. The hand truck for appliances according to claim 1, wherein said upper support arm comprises:
    a threaded lever mounted between the upper ends of said vertical support members;
    a support rod extending from the threaded lever; and
    a concave bar extending transversely across an end of the support rod, the concave bar being adapted for supporting an upper portion of a water heater.

10. The hand truck for appliances according to claim 9, further comprising padding disposed on said concave bar to prevent marring of a surface of the water heater.

11. The hand truck for appliances according to claim 10, further comprising a medial support arm pivotally attached to said main frame below said upper support arm for supporting a medial portion of the appliance.

12. The hand truck for appliances according to claim 1, further comprising:
    an arcuate upper horizontal support extending medially between said vertical support members, the upper horizontal support curving rearward of said main frame;
    an arcuate lower horizontal support member extending between the lower ends of said vertical support members, the lower horizontal support curving rearward of said main frame;
    a vertical support rod attached to the upper and lower horizontal support members, the vertical support rod having a gripping portion extending above the upper horizontal member for tilting the main frame rearward to raise said support plate.

13. The hand truck for appliances according to claim 12, further comprising a handle having an upper end attached to an upper end of the vertical support rod, a medial portion attached to a lower end of the vertical support rod, and a lower end extending below and rearward of the lower horizontal support member.

14. The hand truck for appliances according to claim 13, further comprising:
- a short tubular member extending transversely across the lower end of said handle; and
- an axle tube extending through the tubular member, said wheels being rotatably mounted at opposite ends of the axle tube, the axle tube being supported centrally by the tubular member.

15. The hand truck for appliances according to claim 14, further comprising a pair of V-shaped supports extending rearward from the lower ends of the main frame vertical support members, the V-shaped members having vertices attached to lateral ends of said axle tube in order to support said axle tube laterally.

16. The hand truck for appliances according to claim 15, wherein said spacer bars have first ends attached to the lower ends of said main frame vertical support members and second ends extending forward of said main frame, the hand truck further comprising support plate mounts extending downward from the second ends of said spacer bars, said support plate being joined to the support plate mounts adjacent a rear edge of said support plate.

17. The hand truck for appliances according to claim 16, wherein the rear edge of said support plate is arcuate, the arcuate rear edge being configured for abutting the peripheral wall of an arcuate water heater drain pan.

18. The hand truck for appliances according to claim 1, wherein said spacer bars comprise elongate tubular members having front ends forming orthogonally disposed plate mounts, said support plate being attached to the plate mounts adjacent a rear edge of the support plate, the tubular members having a medial portion attached to the lower ends of said main frame vertical support members, the tubular members having rear ends extending rearward of said main frame.

19. The hand truck for appliances according to claim 18, further comprising:
- a bracket, the rear ends of said spacer bars being joined to said bracket, said spacer bars having a V-shaped configuration with a vertex at the bracket; and
- an axle tube having a central portion attached to the bracket, said wheels being rotatably mounted at opposite ends of the axle tube.

20. The hand truck for appliances according to claim 1, further comprising a strap and a strap buckle attached to said main frame, said strap being adapted for encircling the appliance and being releasably secured to the buckle in order to retain the appliance on said support plate.

* * * * *